UNITED STATES PATENT OFFICE.

ROBERT E. SCHMIDT, OF ELBERFELD, AND PAUL TUST, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY

YELLOW ANTHRACENE DYE.

No. 836,220.      Specification of Letters Patent.      Patented Nov. 20, 1906.

Application filed May 24, 1906. Serial No. 318,476.

*To all whom it may concern:*

Be it known that we, ROBERT E. SCHMIDT, doctor of philosophy, chemist, residing at Elberfeld, and PAUL TUST, chemist, residing at Vohwinkel, near Elberfeld, Kingdom of Prussia, Germany, citizens of the German Empire, have invented new and useful Improvements in Yellow Anthracene Dye, of which the following is a specification.

Our present invention relates to the production of a new dyestuff of the anthracene series from which a vat can be prepared and which dyes unmordanted cotton yellow shades from such a vat. The process for its production consists in heating beta-methylanthraquinone with sulfur.

In carrying out our process practically we can proceed as follows, the parts being by weight: A mixture of ten parts of beta-methylanthraquinone and forty parts of sulfur is heated from 250°–300° centigrade for from three to four hours until the evolution of hydrogen sulfid ceases. After cooling, the solid melt is pulverized and freed from admixed sulfur by boiling it with an aqueous solution of sodium sulfid. The resulting product can be further purified by extraction with hot pyridin, which dissolves the excess of beta-methylanthraquinone.

Our new dyestuff is a dark-yellow crystalline powder insoluble in dilute acids and alkalies, almost insoluble in glacial acetic acid and pyridin, and scarcely soluble in hot nitrobenzene. It dissolves in concentrated sulfuric acid with a violet color. Upon treatment with alkaline reducing agents, such as an alkaline solution of hydrosulfite of sodium, it yields an orange-brown vat which dyes unmordanted cotton orange-brown shades, which by washing with exposure to the air change to pure yellow fast shades.

Having now described our invention and in what manner the same is to be performed, what we claim as new, and desire to secure by Letters Patent, is—

The herein-described new yellow dyestuff which can be obtained by heating beta-methylanthraquinone with sulfur, which dyestuff is a dark-yellow crystalline powder soluble in concentrated sulfuric acid with a violet color; giving an orange-brown vat with hydrosulfite and caustic-soda lye, which vat dyes unmordanted cotton orange-brown shades which shades become yellow when washed with exposure to the air, substantially as hereinbefore described.

In testimony whereof we have hereunto set our hands in the presence of two subscribing witnesses.

ROBERT E. SCHMIDT.
PAUL TUST.

Witnesses:
OTTO KÖNIG,
J. A. RITTERSHAUS.